United States Patent
Tanaka

(10) Patent No.: US 11,343,392 B2
(45) Date of Patent: May 24, 2022

(54) IMAGE PROCESSING APPARATUS AND IMAGE PROCESSING METHOD

(71) Applicants: KABUSHIKI KAISHA TOSHIBA, Tokyo (JP); TOSHIBA TEC KABUSHIKI KAISHA, Tokyo (JP)

(72) Inventor: Norio Tanaka, Numazu Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/149,360

(22) Filed: Jan. 14, 2021

(65) Prior Publication Data

US 2021/0136240 A1    May 6, 2021

Related U.S. Application Data

(63) Continuation of application No. 16/555,249, filed on Aug. 29, 2019, now Pat. No. 10,931,839, which is a continuation of application No. 15/926,110, filed on Mar. 20, 2018, now abandoned.

(30) Foreign Application Priority Data

Jul. 7, 2017  (JP) .............................. JP2017-133895

(51) Int. Cl.
  *H04N 1/00*   (2006.01)
  *H04N 1/387*  (2006.01)

(52) U.S. Cl.
  CPC ..... *H04N 1/00442* (2013.01); *H04N 1/00466* (2013.01); *H04N 1/00811* (2013.01); *H04N 1/3873* (2013.01)

(58) Field of Classification Search
  None
  See application file for complete search history.

(56) References Cited

U.S. PATENT DOCUMENTS

| 4,788,578 | A  | 11/1988 | Tamura et al. |
| 5,361,141 | A  | 11/1994 | Aoyama |
| 6,785,488 | B2 | 8/2004  | Katsuyama |

(Continued)

FOREIGN PATENT DOCUMENTS

| CN | 101154081 A | 4/2008 |
| CN | 101320247 A | 12/2008 |

(Continued)

*Primary Examiner* — Dov Popovici
(74) *Attorney, Agent, or Firm* — Kim & Stewart LLP

(57) ABSTRACT

In accordance with an embodiment, an image processing apparatus includes an image reading section configured to read an original document and generate image data, the image data corresponding to the original document or a part of the original document. The image processing apparatus further includes a control panel including a document area for displaying a plurality of images, the plurality of images including an image which corresponds to the image data. The control panel is configured to receive input designating the image corresponding to the image data and at least one other image from the plurality of images. The image processing apparatus also includes a controller, which in response to an instruction, generates an aggregation image including the image corresponding to the image data and the at least one other image from the plurality of images.

20 Claims, 7 Drawing Sheets

(56) References Cited

U.S. PATENT DOCUMENTS

| | | |
|---|---|---|
| 8,290,307 B2 | 10/2012 | Yamashita |
| 8,462,378 B2 | 6/2013 | Takeda et al. |
| 8,537,426 B2 | 9/2013 | Saka |
| 2003/0170041 A1 | 9/2003 | Katsuyama |
| 2008/0259376 A1 | 10/2008 | Takeda et al. |
| 2008/0297811 A1* | 12/2008 | Pierce ............... H04N 1/00416 358/1.6 |
| 2013/0329249 A1 | 12/2013 | Naya |
| 2015/0222787 A1 | 8/2015 | Sakiyama |
| 2017/0013158 A1 | 1/2017 | Obata |
| 2017/0192724 A1* | 7/2017 | Kim ................... H04N 1/00885 |

FOREIGN PATENT DOCUMENTS

| | | |
|---|---|---|
| CN | 101420497 A | 4/2009 |
| CN | 101998017 A | 3/2011 |
| CN | 202004853 U | 10/2011 |
| CN | 104822004 A | 8/2015 |
| CN | 106341565 A | 1/2017 |
| JP | H08331366 A | 12/1996 |
| JP | 2003234887 A | 8/2003 |
| JP | 2005057603 A | 3/2005 |
| JP | 2008109613 A | 5/2008 |
| JP | 2009100211 A | 5/2009 |
| JP | 2016119546 A | 6/2016 |

* cited by examiner

IMAGE PROCESSING APPARATUS AND IMAGE PROCESSING METHOD

CROSS-REFERENCE TO RELATED APPLICATIONS

This application is a continuation of U.S. patent application Ser. No. 16/555,249, filed on Aug. 29, 2019, which is a continuation of U.S. patent application Ser. No. 15/926,110, filed on Mar. 20, 2018, now abandoned, which is based upon and claims the benefit of priority from Japanese Patent Application No. 2017-133895, filed Jul. 7, 2017, the entire contents of each of which are incorporated herein by reference.

FIELD

Embodiments described herein relate generally to an image processing apparatus and an image processing method.

BACKGROUND

If a plurality of original documents such as photographs is aggregated on one sheet, for example, by an image processing apparatus reading a plurality of original documents placed on a document table, or by an image processing apparatus aggregating the original documents with a page aggregation function of Nin1, and the like. However, if a plurality of original documents is placed on the document table, there are problems such as orientation of the original documents becoming unbalanced, which results in unattractiveness. Moreover, depending on the number or sizes of the original documents, all the original documents cannot be placed on the document table in some instances. If the page aggregation function is used, the size of the original document is reduced and aggregated. Therefore, if it is desirable to maintain the original size of the original document, there is a case in which the setting becomes very complicated, for example, when designating a magnification function of a reduction ratio document after aggregation.

DETAILED DESCRIPTION

In accordance with an embodiment, an image processing apparatus includes an image reading section configured to read an original document and generate image data, the image data corresponding to the original document or a part of the original document. The image processing apparatus further comprises a control panel including a document area for displaying a plurality of images, the plurality of images including an image which corresponds to the image data. The control panel is configured to receive input designating the image corresponding to the image data and at least one other image from the plurality of images. The image processing apparatus also includes a controller, which in response to an instruction, generates an aggregation image including the image corresponding to the image data and the at least one other image from the plurality of images.

Hereinafter, an image processing apparatus and an image processing method of an embodiment are described with reference to the accompanying drawings.

Figure 1:
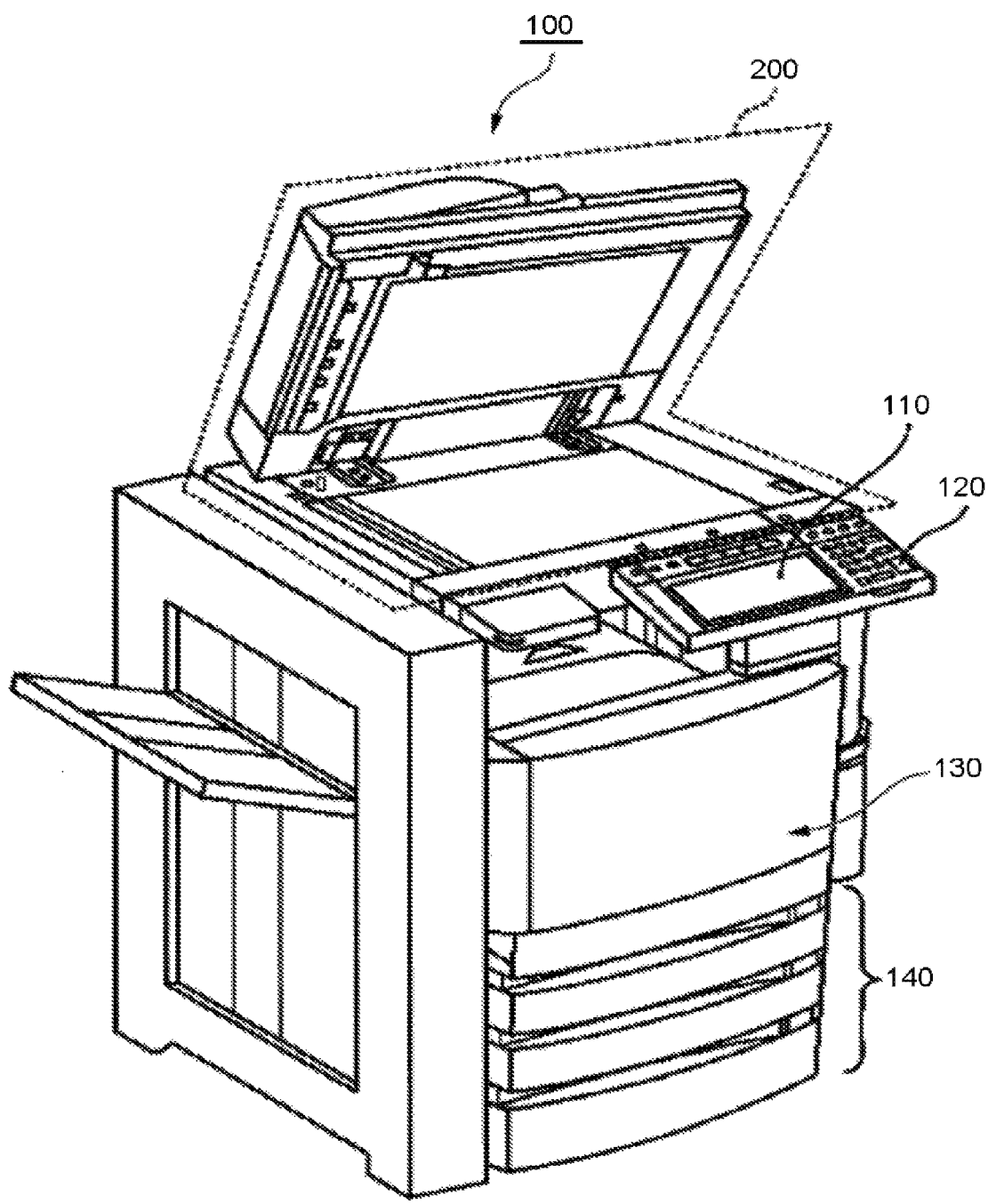
FIG. 1 is an external view exemplifying the overall constitution of an image processing apparatus according to an embodiment.

FIG. 1 is an external view exemplifying the overall constitution of an image processing apparatus 100 according to the embodiment. The image processing apparatus 100 is, for example, an image forming apparatus such as a multi-functional peripheral. The image processing apparatus 100 includes a display 110, a control panel 120, a printer 130, a sheet housing section 140 and an image reading section 200. Furthermore, the printer 130 of the image processing apparatus 100 is a device for fixing a toner image.

The image processing apparatus 100 reads an image on a sheet and generates digital data to generate an image file. The sheet is, for example, an original document or a paper on which characters and images are recorded. The sheet may be any other object as long as it can be read by the image processing apparatus 100.

The display 110 is an image display device such as a liquid crystal display, an organic EL (Electro Luminescence) display and the like. The display 110 displays various information on the image processing apparatus 100.

The control panel 120 includes a plurality of buttons. The control panel 120 receives an operation by a user. The control panel 120 outputs a signal in response to an operation executed by the user to a controller of the image processing apparatus 100. Furthermore, the display 110 and the control panel 120 may be constituted as an integrated touch panel. The control panel 120 is an aspect of a reception section.

The printer 130 forms an image on a sheet based on image information generated by the image reading section 200 or image information received through a communication path. The printer 130 forms an image through the following processing, for example. An image forming section of the printer 130 forms an electrostatic latent image on a photoconductive drum based on the image information. The image forming section of the printer 130 forms a visible image by attaching a developer to the electrostatic latent image. Toner is exemplified as a concrete example of the developer. A transfer section of the printer 130 transfers the visible image onto the sheet. A fixing section of the printer 130 fixes the visible image on the sheet by heating and pressurizing the sheet. The sheet on which the image is formed may be a sheet housed in the sheet housing section 140, or a sheet that is manually fed.

The sheet housing section 140 houses the sheet used in the image formation by the printer 130.

The image reading section 200 reads image information of an object to be read as intensity of light. The image reading section 200 records the read image information. The recorded image information may be transmitted to another information processing apparatus via a network. The recorded image information may be used to form an image on a sheet by the printer 130. The image information is constituted by a document image corresponding to the read object and a background image which is a part other than the read object.

Figure 2:
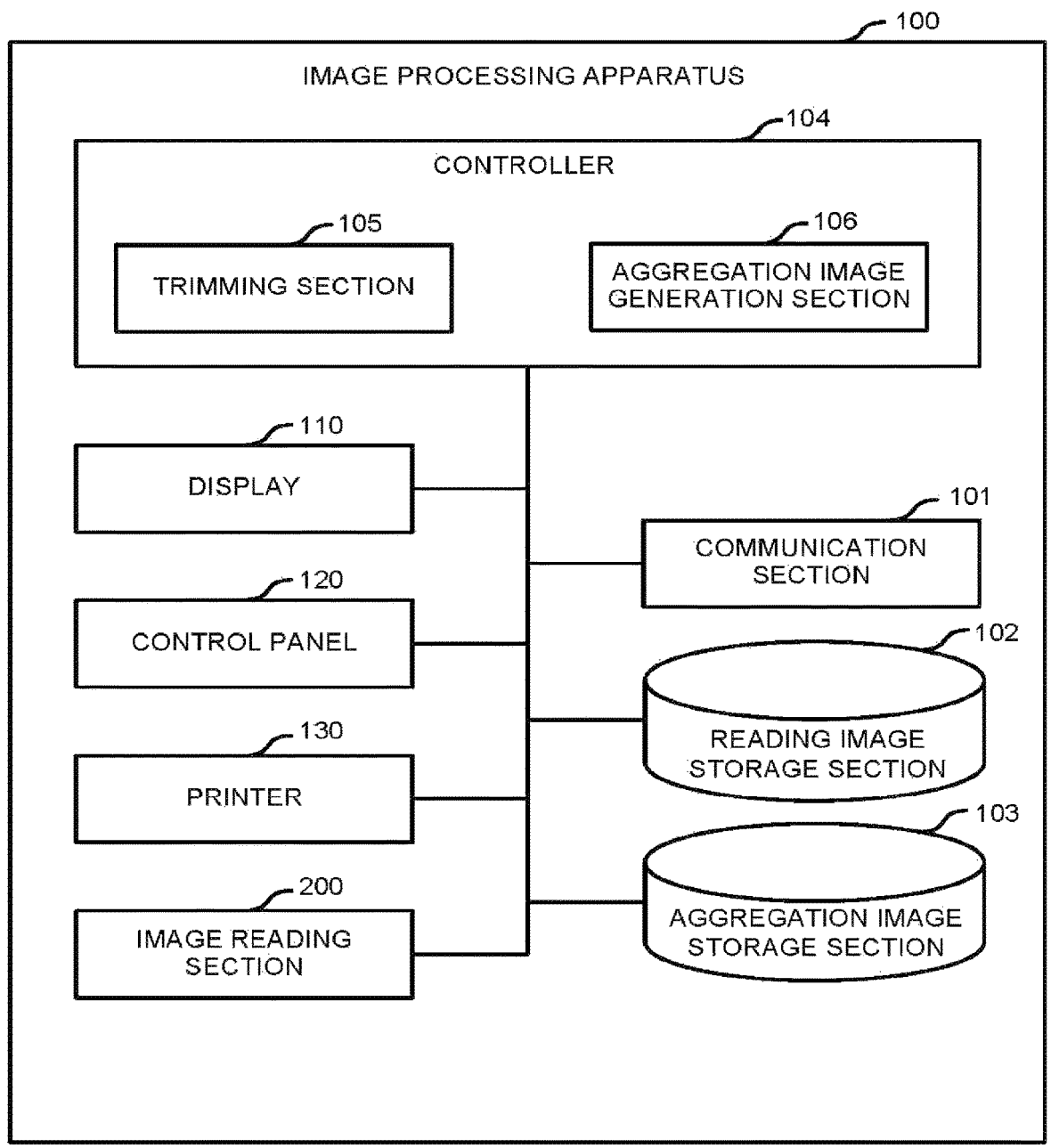
FIG. 2 is a functional block diagram illustrating the functional components of the image processing apparatus according to the embodiment.

FIG. 2 is a block diagram illustrating the functional components of the image processing apparatus 100 according to the embodiment. The image processing apparatus 100 includes a communication section 101, a reading image storage section 102, an aggregation image storage section 103, a controller 104, the display 110, the control panel 120, the printer 130 and the image reading section 200.

The communication section 101 is a network interface. The communication section 101 communicates with an external terminal via a network. The communication section 101 may perform communication by a communication method such as a LAN (Local Area Network), a PSTN (Public Switched Telephone Network), a NFC (Near Field Communication), or the like.

The reading image storage section 102 is a storage device, such as a magnetic hard disk device or a semiconductor storage device. The reading image storage section 102 stores image information read by the image reading section 200.

The aggregation image storage section 103 is a storage device such as a magnetic hard disk device or a semiconductor storage device. The aggregation image storage section 103 stores an aggregation image. The aggregation image is an image obtained by collecting image information of plural original documents, independently generated into one image. The aggregation image contains plural images.

The controller 104 controls the operation of each section of the image processing apparatus 100. The controller 104 is a device including, for example, a CPU (Central Processing Unit) and a RAM (Random Access Memory). The controller 104 functions as a trimming section 105 and an aggregation image generation section 106 by executing an image processing program.

The trimming section 105 trims the read image information. Specifically, the trimming section 105 removes the background image included in the read image information from the image information. The trimming section 105 acquires, as the document image, an image that is not removed from the read image information. The trimming section 105 outputs the acquired document image to the aggregation image generation section 106. The trimming section 105 may trim the image information using a well-known method.

The aggregation image generation section 106 generates the aggregation image. Specifically, the aggregation image generation section 106 adds a predetermined partial image to the aggregation image according to an input received from the user. The partial image indicates a part of the read image. The partial image is added to the aggregation image and constitutes a part of the aggregation image. The predetermined partial image may be the document image received from the trimming section 105 or the image information stored in the reading image storage section 102. The aggregation image generation section 106 stores the aggregation image in the aggregation image storage section 103. The aggregation image generation section 106 enables the printer 130 to print the aggregation image.

Figure 3:
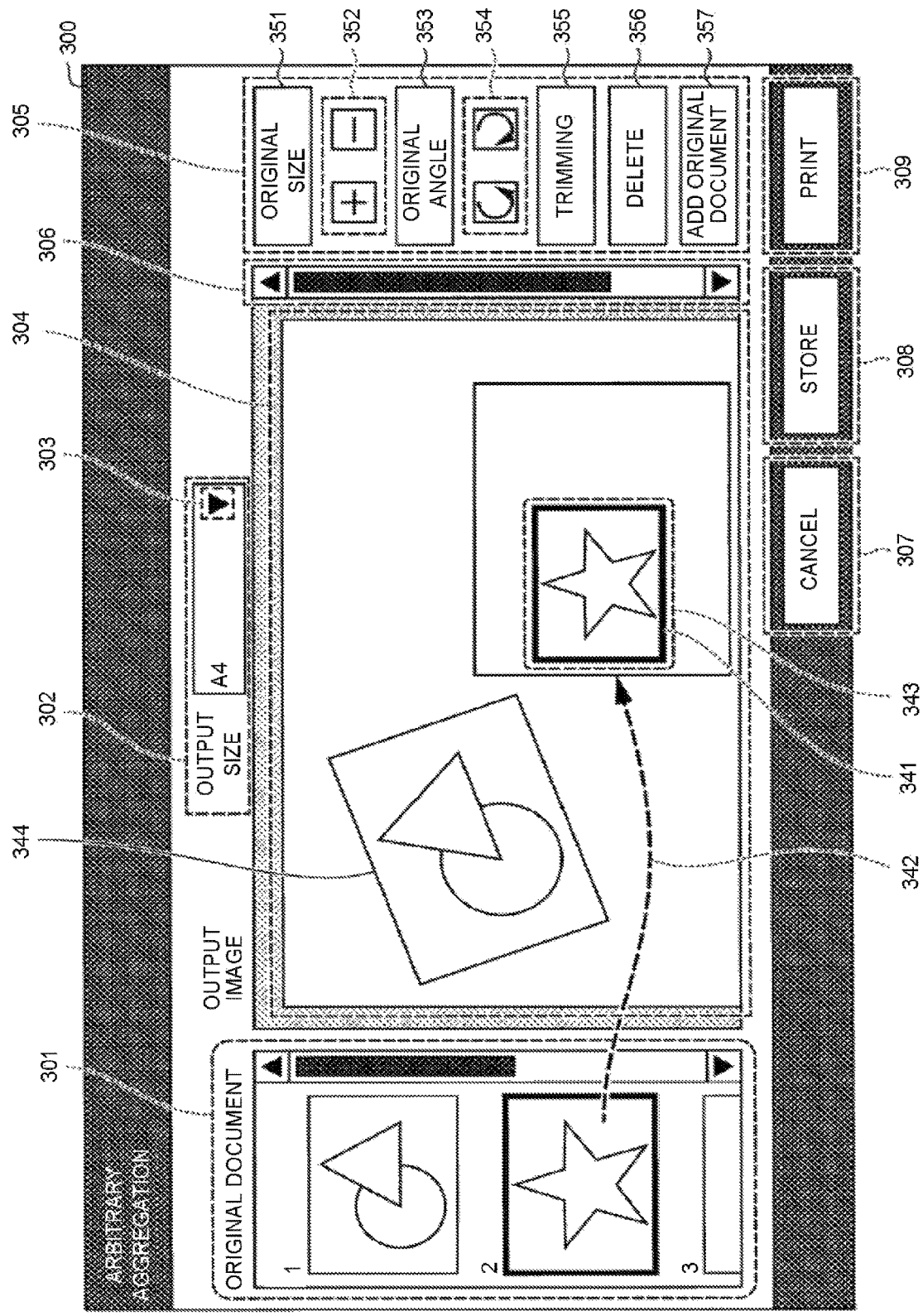
FIG. 3 is a diagram illustrating a specific example of generation of an aggregation image according to the embodiment.

FIG. 3 is a diagram illustrating a specific example of generation of the aggregation image according to the embodiment. An area 300 shows a specific example of an editing screen of the aggregation image. The area 300 includes an area 301, an area 302, an area 303, an area 304, an area 305, an area 306, an area 307, an area 308, and an area 309. The aggregation image generation section 106 executes processing relating to generation of the aggregation image.

The area 301 indicates the document area. In the document area, the document image output from the trimming section 105 and the image information stored in the reading image storage section 102, are displayed. The image displayed in the document area is displayed as a thumbnail image having a predetermined size. The predetermined size may be, for example, 3 cm in length and 4 cm in width.

The area 302 indicates a sheet size at the time of printing. The area 302 includes the area 303 therein. The area 303 is used for receiving a selection instruction of the sheet size. If the area 303 is selected, selectable sheet sizes (for example, A4 or A3) are displayed in a list format in the area 302. The area 303 enables the selected sheet size to be displayed in the area 302. Depending on the selected sheet size, a size of the aggregation image shown in the area 304 is magnified or reduced.

The area 304 indicates the aggregation image being edited. The aggregation image is an image in which plural original documents are arbitrarily arranged. The area 304 includes an area 341, a dotted arrow 342, a dotted line 343, and an area 344. The area 341 and the area 344 indicate the document images arranged in the aggregation image by the user.

The area 341 shows the document image selected and moved from the document area of the area 301. The document image in the area 341 is an image (hereinafter, referred to as a "second image") secondly displayed in the document area. The second image is selected from the area 301 via the control panel 120. The selected second image is slid to a desired place in the area 341. The second image is displayed at a position where the sliding movement of the area 341 is stopped. The dotted line arrow 342 indicates the trajectory of the second image which is slid. The dotted line arrow 342 is an image recorded for the purpose of description and is not displayed on the display 110. The second image is displayed by being surrounded by the dotted line 343.

The image surrounded by the dotted line 343 indicates an image to which a predetermined processing can be executed through the control panel 120. For example, the predetermined processing is shown in the area 305.

The area 344 is the document image arranged in the aggregation image. If the document image in the area 344 is selected via the control panel 120, the dotted line 343 is displayed to surround the area 344. If the dotted line 343 is displayed to surround the area 344, the dotted line 343 surrounding the second image is not displayed. The user can execute the processing displayed in the area 305 on the document image shown in the area 344 via the control panel 120.

The area 305 shows an editing processing executable on the document image contained in the area 304. The area 305 includes an area 351, an area 352, an area 353, an area 354, an area 355, an area 356, and an area 357. The area 351 to the area 357 are used to receive an instruction from the user via the control panel 120. The area 351 to the area 357 are used to execute a predetermined processing in response to the instruction from the user.

The area 351 shows an original size button. If the original size button is selected, the aggregation image generation section 106 sets the selected document image (the image surrounded by the dotted line 343) in the area 341 to its original size. The original size is a size of the document image in the state in which the document image is not magnified or reduced.

The area 352 shows a + button and a − button. If the + button is selected, the aggregation image generation section 106 magnifies the selected document image. The magnification is a processing of displaying the document image by magnifying the document image while maintaining an aspect ratio of the document image. Depending on the number of times or the length of time the + button is selected, the aggregation image generation section 106 magnifies the document image.

If the − button is selected, the aggregation image generation section 106 reduces the selected document image. The reduction is a processing of displaying the document image by reducing the document image while maintaining the aspect ratio of the document image. Depending on the number of times or the length of time the − button is selected, the aggregation image generation section 106 reduces the document image.

The area 353 indicates an original angle button. If the original angle button is selected, the aggregation image generation section 106 sets the selected image to the original angle. The original angle is an angle of the document image in a state in which the document image is not rotated left or right.

The area 354 indicates a left rotation button and a right rotation button. If the left rotation button is selected, the aggregation image generation section 106 rotates the selected document image counterclockwise. Depending on the number of times or the length of time the left rotation button is selected, the aggregation image generation section 106 rotates the document image counterclockwise. If the right rotation button is selected, the aggregation image generation section 106 rotates the selected document image clockwise. Depending on the number of times or the length of time the right rotation button is selected, the aggregation image generation section 106 rotates the document image clockwise.

The area 355 indicates a trimming button. If the trimming button is selected, the aggregation image generation section 106 trims the selected document image. Specifically, the aggregation image generation section 106 receives designation of an arbitrary area included in the selected document image via the control panel 120. The aggregation image generation section 106 acquires the area that receives the designation and removes the other areas.

The area 356 shows a delete button. If the delete button is selected, the aggregation image generation section 106 removes the selected document image from the area 304. The area 357 shows an addition button of the original document. If the addition button of the original document is selected, the aggregation image generation section 106 enables the image reading section 200 to read the new original document. The aggregation image generation section 106 displays the newly read image information in the document area of the area 301.

The area 306 indicates a scroll bar. The area 306 is a scroll bar which is vertically moved. The scroll bar is displayed if the aggregation image cannot be completely displayed on the display 110. If the scroll bar is selected and operated, the aggregation image generation section 106 scrolls the aggregation image. A scroll bar for horizontally moving may be displayed at the bottom of the area 304.

The area 307 indicates a cancel button. If the cancel button is selected, the aggregation image generation section 106 terminates the arbitrary aggregation mode and displays a mode selection screen (described later) on the display 110. The arbitrary aggregation mode is a mode in which one or more images are added on one image and the aggregation image is generated by further changing the size and the orientation of the added image.

The area 308 indicates a storage button. If the storage button is selected, the aggregation image generation section 106 terminates the arbitrary aggregation mode and stores the aggregation image displayed in the area 304 in the aggregation image storage section 103. The area 309 indicates a printing button. If the printing button is selected, the aggregation image generation section 106 terminates the arbitrary aggregation mode and enables the printer 130 to print the aggregation image displayed in the area 304.

Figure 4:
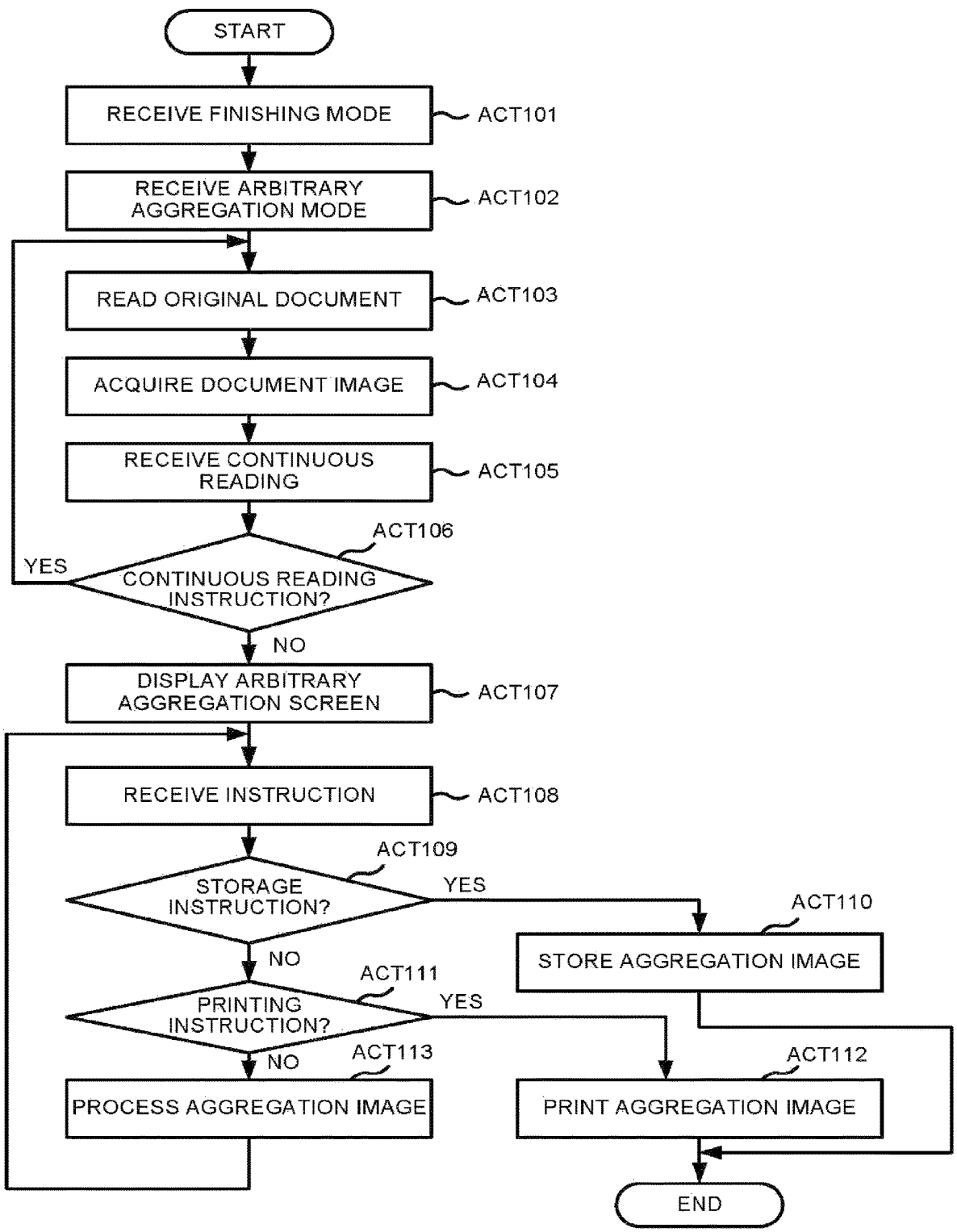
FIG. 4 is a flowchart illustrating the flow of a processing of generating the aggregation image according to the embodiment.

FIG. 4 is a flowchart illustrating the flow of the process of generating the aggregation image according to the embodiment. The control panel 120 of the image processing apparatus 100 receives an instruction of a finishing mode from the user (ACT 101).

Figure 5:
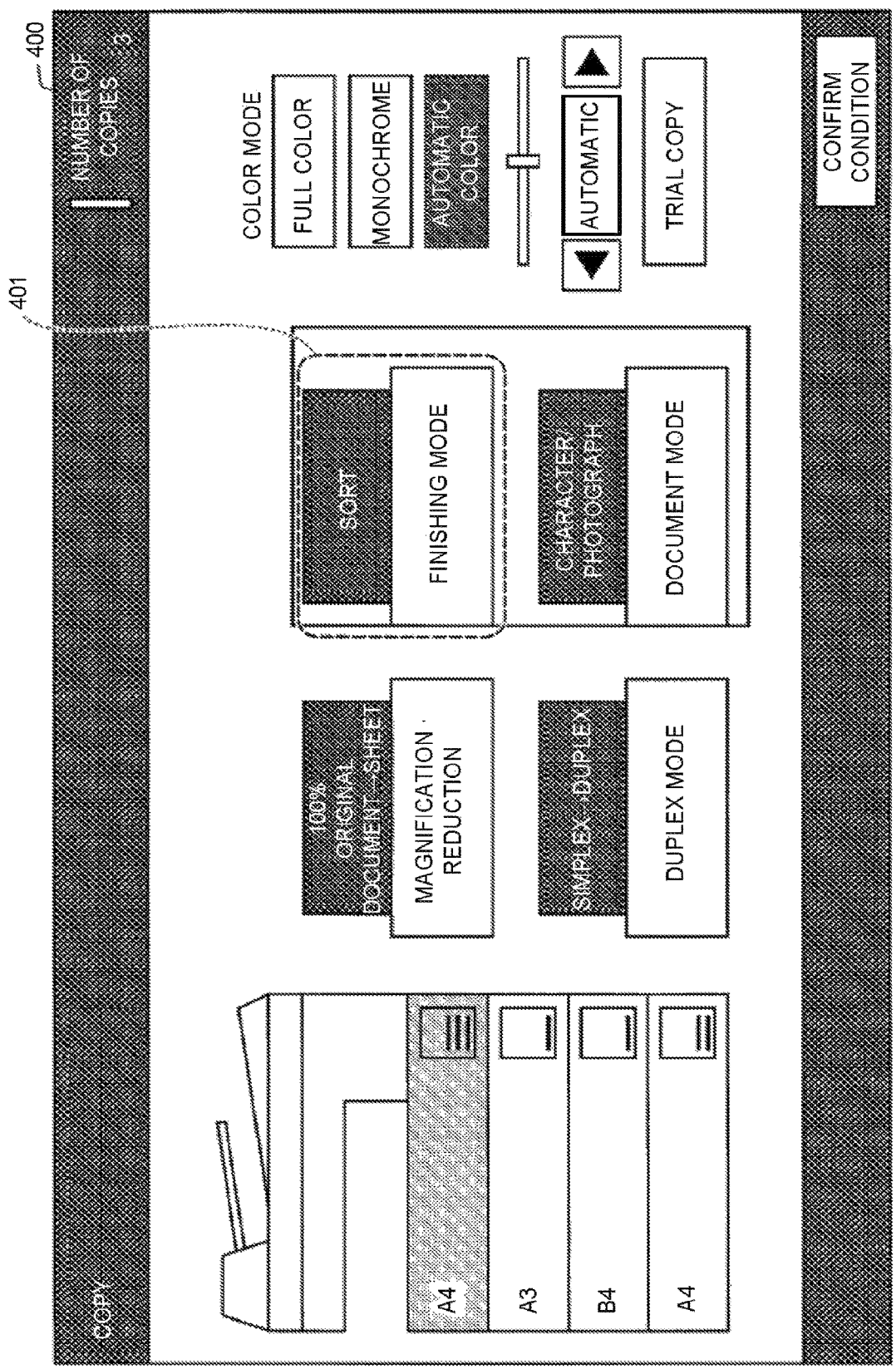
FIG. 5 is a diagram illustrating a specific example of a case of selecting a finishing mode according to the embodiment.

FIG. 5 is a diagram illustrating a specific example of a case of selecting the finishing mode according to the embodiment. An area 400 shows a specific example of a mode selection screen displayed on the display 110. The area 400 includes an area 401. The area 401 is used for shifting to the screen for selecting the finishing mode of the printed sheet. The controller 104 shifts to the finishing mode by receiving the selection of the area 401 from the user through the control panel 120. The finishing mode is a mode for determining a finishing state of the printed sheet. In the finishing mode, for example, whether sheets are sorted and discharged, the direction of the discharged sheet, and whether the arbitrary aggregation is performed are determined.

Figure 6:
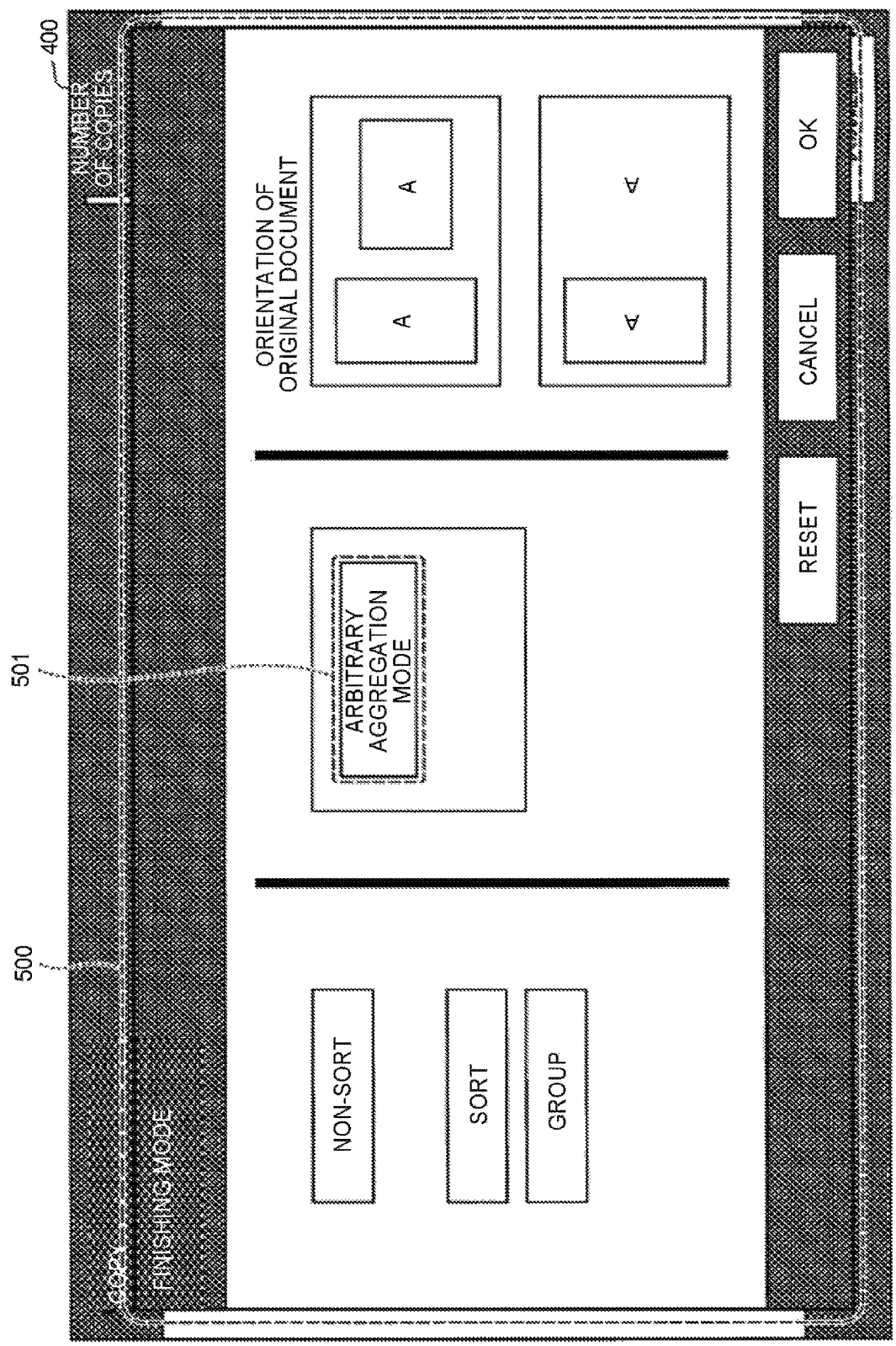
FIG. 6 is a diagram illustrating a specific example of a case of selecting an arbitrary aggregation mode according to the embodiment.

Returning to FIG. 4, the description of the flowchart is continued. The control panel 120 receives an instruction of an arbitrary aggregation mode from the user (ACT 102). FIG. 6 is a diagram illustrating a specific example of a case of selecting the arbitrary aggregation mode according to the embodiment. If the selection of the finishing mode is received from the user, an area 500 is superimposed on the area 400 to be displayed on the display 110. The area 500 shows a specific example of a screen indicating the finishing mode. The area 500 includes an area 501. The area 501 is used for shifting to the arbitrary aggregation mode. The controller 104 shifts to the arbitrary aggregation mode by receiving the selection of the area 501 from the user through the control panel 120.

Returning to FIG. 4, the description of the flowchart is continued. The image reading section 200 of the image processing apparatus 100 reads the arranged original document (ACT 103). The image reading section 200 generates the image information from the read original document. The trimming section 105 acquires the document image from the image information and outputs the acquired document image to the aggregation image generation section 106 (ACT 104).

Figure 7:
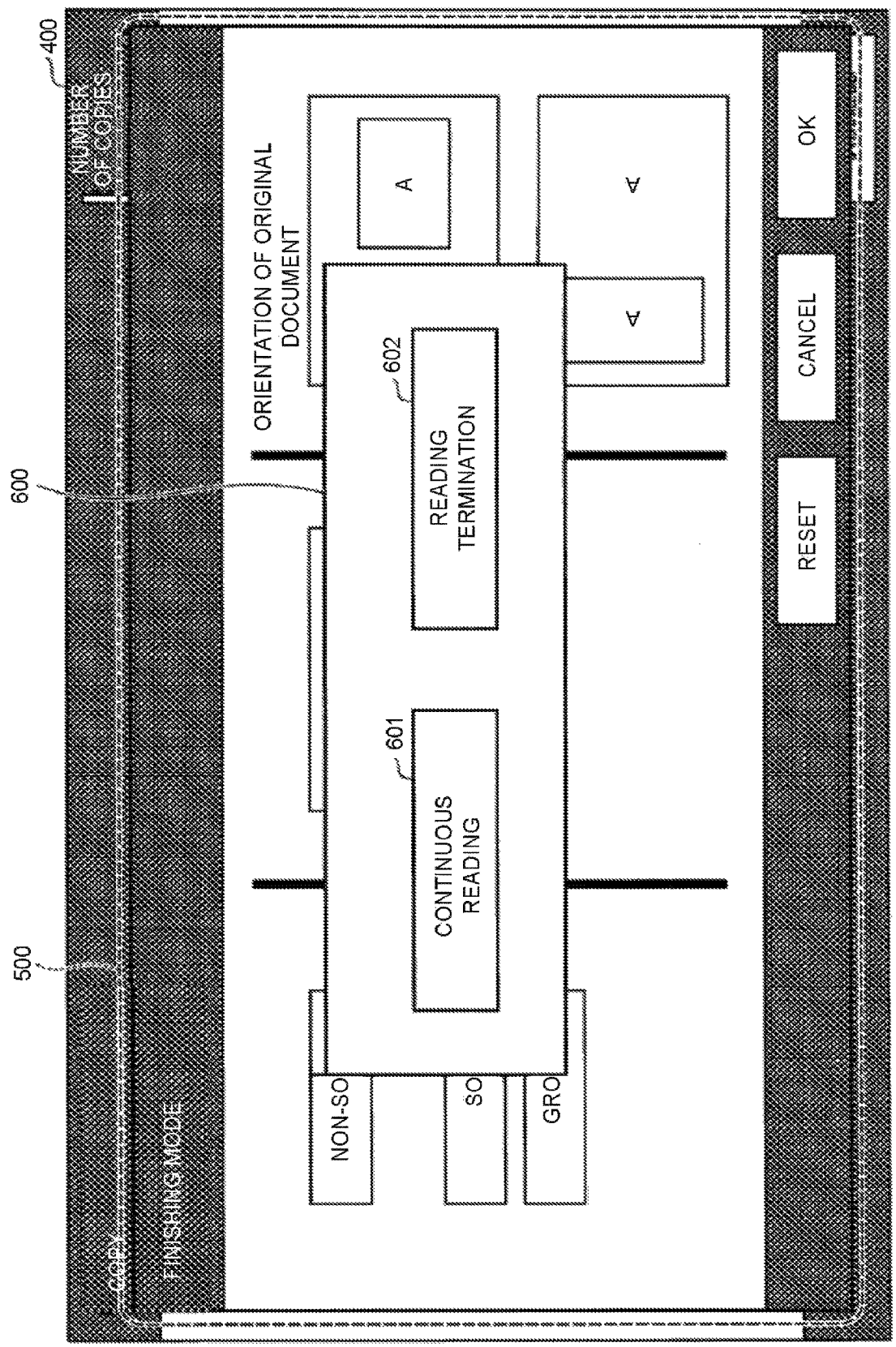
FIG. 7 is a diagram illustrating a specific example of a case of selecting whether to execute continuous reading according to the embodiment.

The control panel 120 receives an instruction from the user on whether to continue reading (ACT 105). FIG. 7 is a diagram illustrating a specific example of a case of selecting whether to execute the continuous reading according to the embodiment. If the original document is read, an area 600 is superimposed on the area 400 and the area 500 to be displayed on the display 110. The area 600 shows a specific example of a screen for receiving a selection of whether to continuously read the original document. The area 600 includes an area 601 and an area 602. The area 601 is used for selecting continuous reading of the original document. The controller 104 enables the image reading section 200 to read the original document by receiving the selection of the area 601 from the user through the control panel 120. The area 602 is used for making a selection to terminate reading of the original document. The controller 104 enables the image reading section 200 to terminate the reading of the original document by receiving the selection of the area 602 from the user through the control panel 120.

Returning to FIG. 4, the description of the flowchart is continued. The controller 104 determines whether or not the received instruction is the continuous reading instruction (ACT 106). If the received instruction is the continuous reading instruction (Yes in ACT 106), the flow proceeds to the processing in ACT 103. If the received instruction is not the continuous reading instruction (No in ACT 106), the controller 104 displays the arbitrary aggregation screen including the aggregation image on the display 110 (ACT 107).

The aggregation image generation section 106 receives an instruction from the user via the control panel 120 (ACT 108). The aggregation image generation section 106 determines whether or not the received instruction is a storage instruction (ACT 109). If the received instruction is the storage instruction (Yes in ACT 109), the aggregation image generation section 106 stores the aggregation image in the aggregation image storage section 103, and terminates the processing (ACT 110).

If the received instruction is not the storage instruction (No in ACT 109), it is determined whether or not the received instruction is a printing instruction (ACT 111). If the received instruction is the printing instruction (Yes in ACT 111), the aggregation image generation section 106 enables the printer 130 to print the aggregation image and terminates the processing (ACT 112).

If the received instruction is not the printing instruction (No in ACT 111), the aggregation image generation section 106 processes the aggregation image according to the received instruction and shifts to the processing in ACT 108 (ACT 113). Specifically, it is a processing as shown in FIG. 3.

In the image processing apparatus 100 as described above, the aggregation image generation section 106 generates the aggregation image obtained by aggregating a plurality of images into one image. The aggregation image generation section 106 prints the generated aggregation image. Therefore, the user can print a plurality of the original documents by aggregating them into one sheet. As a specific usage example, for example, both sides of a license can be printed on one sheet.

Furthermore, the aggregation image generation section 106 returns the size and angle of the original document to the original state with one button even if the size and angle of the original document in the document image included in the aggregation image are changed. The aggregation image generation section 106 can change the sheet size while editing the aggregation image. Therefore, even if a plurality of images is arranged at an equal magnification, it is possible to easily select a sheet size containing all the images.

In the above embodiments, the aggregation image generation section 106 is a software functional section, but it may be a hardware functional section such as a LSI.

According to at least one embodiment described above, by having the aggregation image generation section 106, it is possible to print a plurality of the original documents more easily by aggregating them.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the embodiments described herein may be made without departing from the spirit of the invention. The accompanying claims and their equivalents are intended to cover such forms or modifications as would fall within the scope and spirit of the invention. In these embodiments, a single image reading apparatus (e.g., scanner) without an image forming section such as the printer 130 may be contained.

What is claimed is:

1. An image processing apparatus, comprising:
   an image reading section configured to generate image data from a document;
   a control panel configured to receive a designation of sheet images to be aggregated from a plurality of sheet images generated by the image reading section;
   a display to display the plurality of sheet images generated by the image reading section and an aggregation image in which the sheet images designated from the plurality of sheet images are aggregated onto a single sheet; and
   a controller configured to:
     control the display to display the designated sheet images from the plurality of sheet images, and
     generate the aggregation image including at least a first sheet image and a second sheet image from the designated sheet images.

2. The image processing apparatus according to claim 1, wherein
   the control panel is configured to receive a size designation instruction designating a size of the aggregation image, and
   the controller generates the aggregation image with the size designated by the size designation instruction.

3. The image processing apparatus according to claim 2, wherein the controller generates the aggregation image in a form designated by an editing instruction.

4. The image processing apparatus according to claim 1, wherein
   the control panel is configured to receive an editing instruction for editing the aggregation image, and
   the controller edits the aggregation image according to the editing instruction.

5. The image processing apparatus according to claim 1, further comprising:
   a storage section configured to store the image data.

6. The image processing apparatus according to claim 1, wherein the controller is further configured to adjust a relative angle of the first sheet image on the display.

7. The image processing apparatus according to claim 6, wherein the controller is further configured to return the first sheet image to an original angle from the adjusted relative angle.

8. The image processing apparatus according to claim 1, wherein the controller is further configured to adjust a size of the first sheet image in the aggregation image relative to a size of the second sheet image.

9. The image processing apparatus according to claim 8, wherein the control panel is further configured to receive an instruction to acquire additional image data corresponding to a third sheet image.

10. The image processing apparatus according to claim 1, wherein the control panel is further configured to receive an instruction to acquire additional image data corresponding to a third sheet image.

11. The image processing apparatus according to claim 1, wherein the control panel is further configured to receive an instruction to delete at least one of the first sheet image and the second sheet image from the aggregation image.

12. A controller for an apparatus, the controller being configured to:
- read a first document and generate a first sheet image corresponding to a portion of the first document;
- read a second document and generate a second sheet image corresponding to a portion of the second document;
- display the first sheet image and the second sheet image on a display;
- receive a designation of the first sheet image and the second sheet image;
- receive instructions arranging the first sheet image and the second sheet image on the display;
- display the designated first sheet image and the second sheet image on the display according to the instructions arranging the first sheet image and the second sheet image; and
- generate an aggregation image including the first sheet image and the second sheet image on a single sheet as arranged in the display.

13. The controller of claim 12, wherein the controller is further configured to change an output size of the aggregation image.

14. The controller of claim 12, wherein the controller is further configured to adjust a relative angle of the first sheet image on the display.

15. The controller of claim 14, wherein the controller is further configured to return the first sheet image to an original angle from the adjusted relative angle.

16. The controller of claim 12, wherein the controller is further configured to adjust a size of the first sheet image in the aggregation image relative to a size of the second sheet image.

17. The controller of claim 16, wherein the controller is further configured to receive an instruction to acquire additional image data corresponding to a third document and to add the additional image data to a memory.

18. The controller of claim 12, wherein the controller is further configured to receive an instruction to acquire additional image data corresponding to a third document and to add the additional image data to a memory.

19. The controller of claim 12, wherein the controller is further configured to receive an instruction to scale the first sheet image or the second sheet image according to a size of the single sheet.

20. The controller of claim 19, wherein the controller is further configured to receive an instruction to delete the first sheet image or the second sheet image from the aggregation image.

* * * * *